Sept. 28, 1965  T. BUDZICH ETAL  3,208,396
FLUID PRESSURE CONTROL SYSTEM
Filed Sept. 6, 1962  3 Sheets-Sheet 1

INVENTORS
TADEUSZ BUDZICH and
ARNOLD PITT
By Claire K. Mueller, Jr.
Attorney

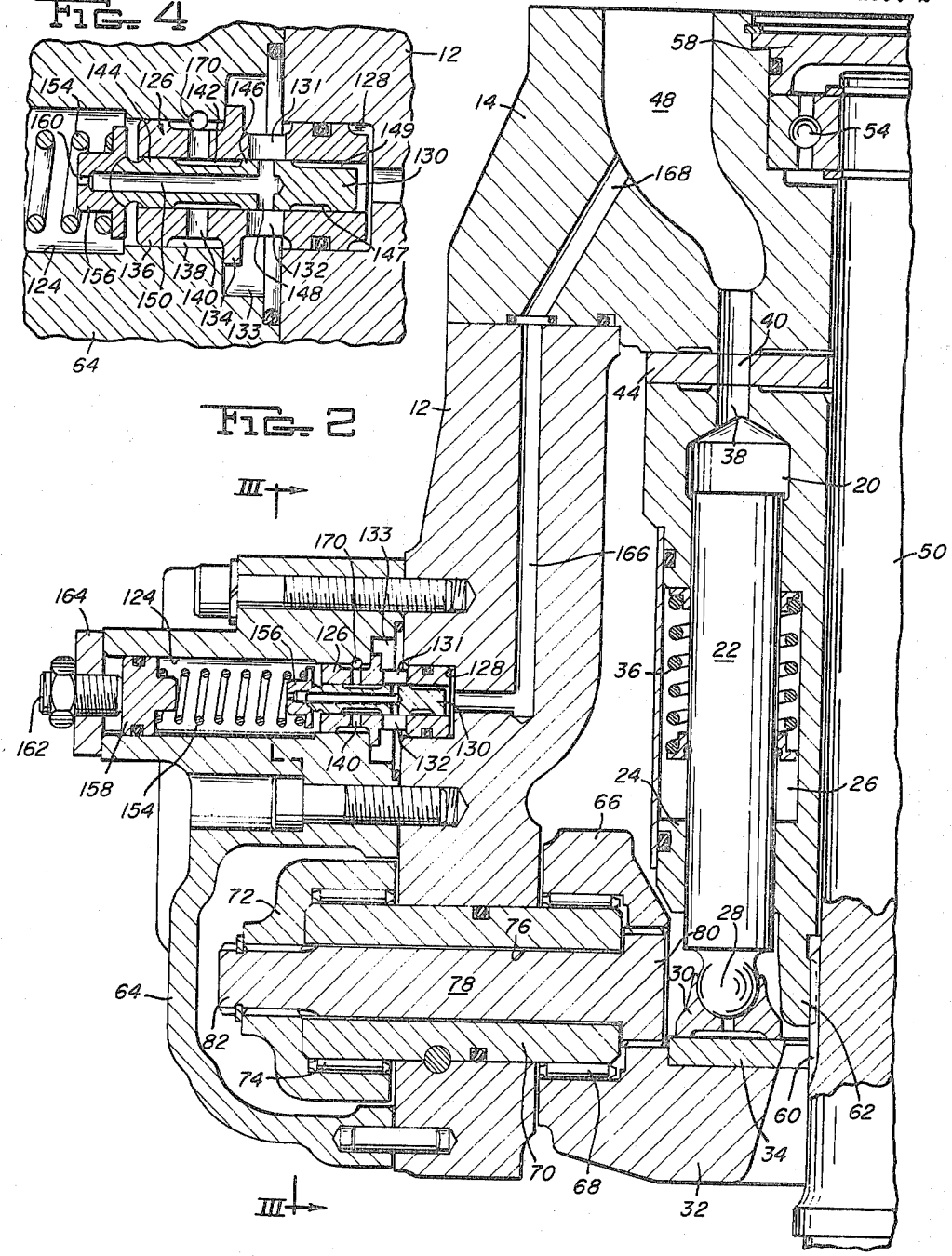

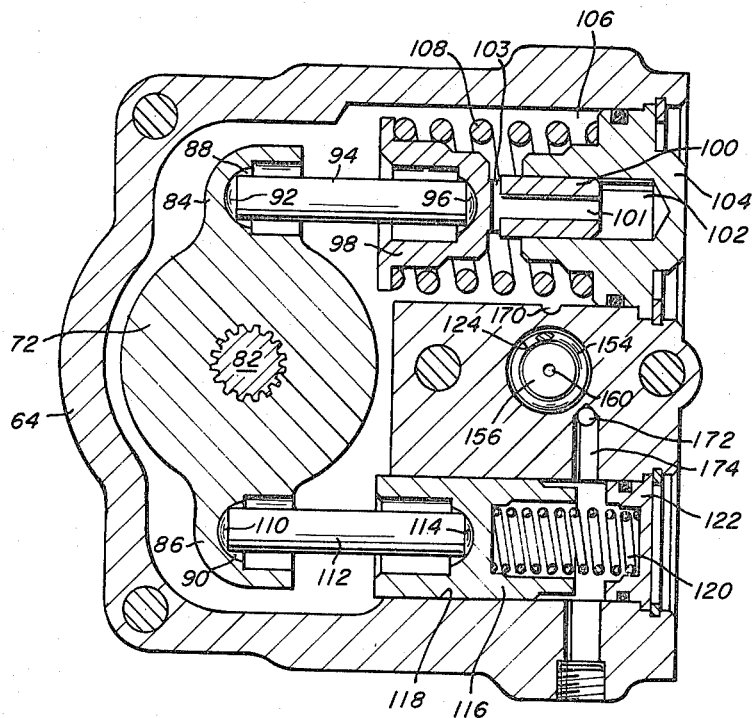

United States Patent Office 3,208,396
Patented Sept. 28, 1965

3,208,396
FLUID PRESSURE CONTROL SYSTEM
Tadeusz Budzich, 3340 Colwyn Road, Cleveland, Ohio, and Arnold Pitt, 5 Hillgarden Road, Weston, Ontario, Canada
Filed Sept. 6, 1962, Ser. No. 221,747
13 Claims. (Cl. 103—162)

The present invention relates generally to a fluid pressure control system for use with variable displacement fluid pumps and motors and in particular to a fluid pressure control system that varies the displacement of the pump or motor to maintain the fluid pressure thereof relatively constant.

Control apparatus for maintaining the fluid pressure of a hydraulic circuit at a relatively constant level by varying the pump displacement are well known in the art. Generally, control systems of this type operate a displacement changing member of the pump that is biased towards the position of maximum flow by a spring. A hydraulic control piston arrangement exerts a force on the displacement changing member in a direction opposite that of the biasing spring. To incorporate control systems of this type with fluid pumps and motors involves substantial changes in the internal mechanism thereof. In particular, considerable difficulties are encountered in linking the control piston arrangement to the displacement changing member, since the latter must describe an arcuate path during its operation.

It is, therefore, a principal object of this invention to provide a fluid pressure control system that may be used with conventional variable displacement pumps or motors without requiring extensive changes in the design or structure thereof.

Another object of this invention is to provide a fluid pressure control system that automatically varies the displacement member of the pump or motor in response to changes in the system pressure to maintain the system pressure at a substantially constant level.

A more particular object of this invention is to provide a fluid pressure control system having an actuating arrangement that engages the tiltable cam plate of the pump or motor at its center of rotation to vary the angle thereof in response to fluid pressure changes in the system.

Another object of this invention is to provide a control system wherein a linear movement responsive to fluid pressure changes in the system is converted to a proportional torsional or rotational movement, which is transmitted to the tiltable cam plate.

Still another object of this invention is to provide a fluid pressure control system that utilizes the force of the piston return springs of the pump in providing the adjusting action on the tiltable cam plate.

These and other objects of the invention will be apparent from the following description and drawings, in which:

FIGURE 2 is a view in partial section taken along the lines II—II of FIGURE 1 showing the fluid pressure control system of this invention;

FIGURE 3 is a view in partial section taken along lines III—III of FIGURE 2 showing further structure of the fluid pressure control system of this invention; and FIGURE 4 is a detailed view of the control sleeve and spool.

Figure 1:
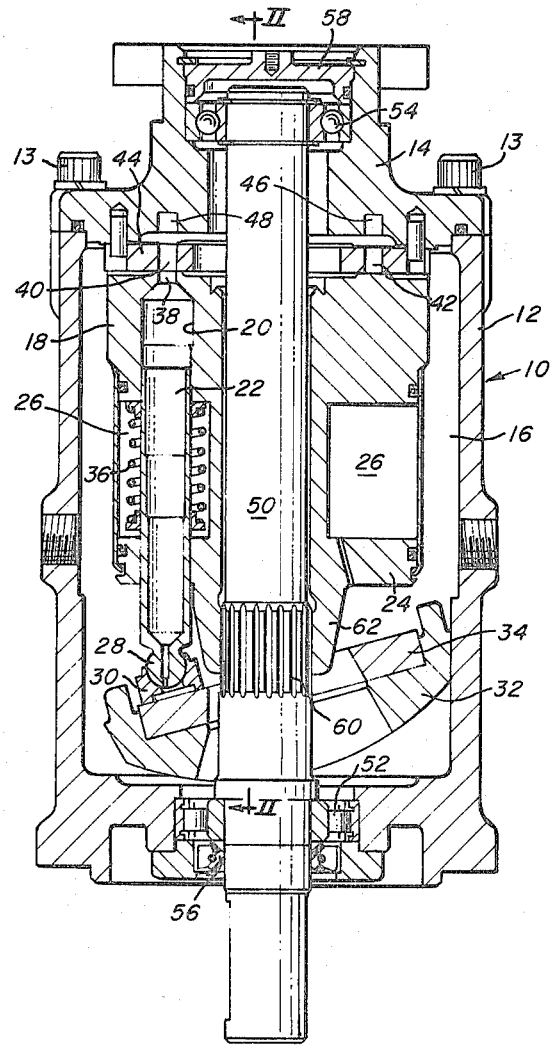
FIGURE 1 is an elevational view in section of a variable displacement pump embodying this invention.

Referring now to the drawings and, for the present, to FIGURE 1, a conventional variable displacement fluid pump designated generally as 10 is shown having a housing 12 which is connected by bolts 13 to an end cover 14 to form a chamber 16. The pump is provided with a cylinder barrel 18 having cylindrical bores 20 within which pistons 22 are slidably mounted. The cylinder barrel 18 has a lower flange 24, which defines an annular groove 26. The pistons 22 are equipped with part-spherical ends 28 universally mounting piston shoes 30. A tiltable cam plate 32 having a wear plate 34 provides the actuation surface for the piston shoes 30. The pistons 22 and the piston shoes are maintained in contact with wear plate 34 by means of piston return springs 36, which are positioned within the annular grooves 26. The cylindrical bores 20 communicate through passages 38 with kidney-shaped ports 40 and 42 provided in valve plate 44. The ports 40 and 42 are in direct communication with pump ports 46 and 48 provided in the end cover 14 (FIGURE 2). A shaft 50, which is connected to and driven by a prime mover (not shown), is journalled in the housing 12 and end cover 14 by bearings 52 and 54, respectively. The shaft is sealed by a shaft seal 56 and an end cap 58. It drives the cylinder barrel 18 by means of a spline 60 that is in engagement with an extension 62 of the cylinder barrel. The apparatus described thus far is conventional.

Referring now to FIGURES 2 and 3 of the drawings, the fluid pressure control system of the present invention is housed by an envelope 64 that is bolted to the pump housing 12. The cam plate 32 is provided with an annular flange 66 that circumscribes the axis about which the cam plate tilts or rotates. The flange 66 is journalled by bearings 68 on one end of a cam pin 70 extending from the envelope 64 through the housing 12. A rocker arm 72 is journalled by bearings 74 to the other end of the cam pin 70 contained within the envelope 64; hence, the axis about which the rocker arm rotates coincides with that of the cam plate. A through longitudinal bore 76 is provided in the cam pin 70, within which a torsion shaft 78 is rotatably mounted. This shaft is provided with a splined end 80 that engages the titlable cam plate 32 at its center of rotation and a splined end 82 that engages the rocker arm 72 at its center of rotation. The rocker arm is provided with two opposed extensions 84 and 86 having part spherical surfaces 88 and 90, respectively. The part spherical surface 88 is engaged by a mating surface 92 of a push rod 94. The opposed surface 96 of the push rod 94 engages a spring guide 98 having a cylindrical extension 100 slidably mounted within a cylindrical cavity 102 provided in a spring cover 104. The cavity 102 is connected by passages 101 and 103 to a chamber 106. The spring cover 103 acts as a closure for the chamber 106 and as a mounting for biasing spring 108 extending between the spring cover 104 and the spring guide 98. The spring 108 provides the biasin force for urging the push rod 94 toward the rocker arm 72. The part-spherical surface 90 of extension 86 provided on the rocker arm 72 is engaged by a mating surface 110 of a push rod 112. The opposed surface 114 of the push rod 112 engages a control piston 116 slidably mounted within bore 118. A biasing spring 120 is mounted between the control piston 116 and a spring cover 122 which provides a closure for the bore 118. The spring 120 supplies the biasing force for urging the push rod 112 toward the rocker arm 72. The spring 108 is selected so that its biasing force is larger than the combined force of the spring 120 and the force of the moment applied to the cam plate by the piston return springs.

The apparatus of the fluid pressure control system described above is actuated by a signal produced by the arrangement shown in FIGURE 2 now to be described, and in FIGURE 4.

The envelope 64 is provided with a bore 124 and the housing 12 is provided with a bore 128. A control sleeve 126 is mounted within the bore 128 and a portion of the bore 124. A control spool 130 is slidably mounted within the control sleeve 126. The control sleeve 126 is equipped with ports 131 and 132 that open into a cavity 133 which is an enlarged portion of the bore 124. The control sleeve 128 has lands 134 and 136 which define an annular groove 138, therebetween. The annular groove 138 is connected by drilling 140 to annular groove 142 defined between lands 144 and 146 provided on the control spool 130. The control spool is additionally provided with a groove 147, and a relieved portion 149. A transverse passage 148 extends through the control spool and serves to connect the ports 131 and 132. The passage 148 intersects a longitudinal passage 150 also provided within the control spool 130. A control spring 154 is disposed within the bore 124. This spring is compressed between a spring retainer 156, sealed within the bore 124, and a spring guide 158. The spring retainer 156 engages the control spool 130 and is equipped with a longitudinal passage 160 that connects with the longitudinal passage 150 of the control spool. The spring guide may be moved relative to the spring retainer 156 by adjustment of a screw 162 extending through a cover 164. In this manner, the compression of control spring 154 may be varied. Passages 166 in the housing and 168 in the end cover serve to connect the high pressure port 48 with the bore 128. The annular groove 138 is connected by a passage 170 to the chamber 106 shown in FIGURE 3. The cavity 133 is connected to bore 118 by passagers 172 and 174, also shown in FIGURE 3.

With respect to the operation of the above described apparatus, the rotation of shaft 50 by the prime mover, is transmitted by the spline 60 to the cylinder barrel 18. The rotation of the cylinder barrel induces a reciprocating motion in the pistons 22, which under the bias of the return springs 36 will follow the inclined surface of the wear plate 34. The reciprocating motion of the pistons causes the circulation of fluid in the bores of the cylinder barrel, which is in turn phased by the valve plate 44 to the pump ports 46 and 48 in a well known manner. The port 48 will always be the high-pressure port of the pump as hereafter explained. Also, in a well known manner, the volume output of the pump may be varied by changing the angle of the cam plate with respect to the center line of the pump. With the cam plate tilted at the maximum angle, which is the position shown in FIGURE 1, the pump will supply maximum volume output. From this position, rotation of the cam plate toward a position perpendicular to the center line of the pump will cause a gradual decrease in the volume output. When the cam plate reaches the perpendicular position, the volume output will be zero. The control device of the present invention is adapted to change the angle of the cam plate responsive to the fluid pressure in the high-pressure port, in the following manner.

The torsion shaft 78, as previously described, is connected at one end to the cam plate at its center of rotation and at the other end to the rocker arm 72. Hence, any rotation of the rocker arm will cause a corresponding angular displacement of the cam plate and consequently a corresponding variation in the fluid volume output of the pump. Therefore, the volume output of the pump is controlled to provide a constant output pressure level by regulating the angle of the cam plate through rotation of the rocker arm in response to changes in the output pressure from the desired and preselected level. With the rocker arm positioned as shown in FIGURE 3, the cam plate will be about half way between zero output position and its maximum angle.

As hereinbefore described, the push rods 94 and 112 are urged against the opposed extensions 84 and 86, respectively, of the rocker arm by springs 108 and 120, respectively. Since the biasing force of the spring 108 is slightly greater than that of the spring 120 and the force of the moment supplied to the cam plate by the piston return springs, these forces transmitted to the cam plate will cause it to be tilted to the position of maximum output, in the absence of additional force opposing that of the spring 108. However, an opposing force may be selectively applied by means of fluid introduced to the bore 118, through passages 172 and 174. The pressure of the fluid so introduced is made to vary in proportion to any increase in the discharge pressure of the pump above the desired pressure level. This fluid force operates on the control piston 116 to rotate the rocker arm clockwise (as shown in FIGURE 3) to a degree proportional to the increase in fluid pressure above the predetermined level. This rotation of the rocker arm is transmitted to the cam plate, which is thus displaced proportionately to the degree of rocker arm rotation. Therefore, the resulting change in the volume output of the pump is proportional to the degree of rocker arm rotation and consequently the extent of the increase in discharge pressure level of the pump above the preselected level. The fluid pressure supplied to the bore 118 to provide this action is obtained in the following manner.

The compression of the control spring 154 is adjusted by moving screw 162 until the biasing force of this spring acting against the control spool 130 is equal to the pressure of the desired fluid output of the pump, as represented by the fluid pressure existing in the high-pressure port 48. The high pressure fluid from this port passes through passages 168 and 166 to bore 128 and acts on the cross-sectional area of the control spool 130 to oppose the biasing force of the control spring 154. If the pressure of this fluid exceeds the biasing force of the control spring, the spool will slide upward (as seen in FIGURE 2). This movement of the spool will connect the relieved portion 149 and the groove 147 of the control spool with the ports 131 and 132. Thus the fluid will pass into the cavity 133 into which these ports open and thence to the bore 118 (as shown in FIGURE 2) through passages 172 and 174. Simultaneously, the high pressure fluid will also flow into transverse passage 148 and longitudinal passage 150 of the control spool and thence through the longitudinal passage 160 of the spring retainer 156 to the portion of the bore 124 adjacent thereto. The force exerted on the control piston 116 by the high pressure fluid in the bore 118 thereby causes the push rod 112 to rotate the rocker arm clockwise (as shown in FIGURE 3) a distance proportional to the net difference between the sum of this force and that providing the movement to the cam plate by the piston return springs and the biasing force of the spring 108. The rotation of the rocker arm is transmitted through torsion shaft 78 to the tiltable cam plate of the pump by the spline connections 80 and 82. Consequently, the cam plate is displaced by rotational movement of the torsion shaft 78 toward the perpendicular position to an extent proportional to the rotation of the rocker arm and thus the extent to which the output pressure of the pump exceeds the preselected pressure. As previously described, displacement of the cam plate in this manner causes the output pressure of the pump to decrease.

The high pressure fluid entering the portion of the bore 124 adjacent to the spring retainer 156 acts in conjunction with the biasing force of the control spring 154 to oppose the force initially moving the control spool. When these opposing forces exceed the force provided by the high pressure fluid in passages 166 and 168, the control spool will move downward (as seen in FIGURE 2). The land 151 seals in the lower end of the control sleeve isolating relieved portion 149 and the groove 147 from the ports 131 and 132. This consequently stops further passage of the high pressure fluid from passage 166 to the bore 118. In addition, the movement of the control spool connects ports 131 and 132 with the annular groove 138 through annular groove 142 of the control spool. Hence, the high-pressure fluid from the bore 118 is discharged into the chamber 106, which may be regarded as an exhaust zone, through passages 174 and 172, cavity 133, ports 131 and 132, annular grooves 142 and 138, and passage 170. This arrangement also provides for the discharge of the fluid from the bore 124 through longitudinal passages 160 and 150, and transverse passage 148 until the control spool is in equilibrium and is thus returned to the position shown in FIGURE 2.

The arrangement for providing the fluid signal responsive to the volume output of the pump to actuate the push rod 112 need not be the specific arrangement shown and described herein. Any of the known arrangements that produce a signal having a magnitude proportional to the output conditions of the pump may be readily substituted. It may be seen, therefore, that the present invention may be used with conventional installations of the almost any design without requiring any major change in the structure of the equipment with which it is used. Other, more particular advantages are also provided by the invention. During the operation of fluid pumps, the cam plate is subjected to extreme forces resulting from the hydraulic reaction of the pistons bearing against it. With the present invention, this total reaction force is carried by the cam pin and the bearings associated therewith. Consequently, the torsion shaft mounted within the cam pin is not subjected to any transverse load but only the torsion of the rocker arm. This results in the frictionless operation of the torsion shaft, which provides extremely accurate response and thus accurate control. The accuracy of control is further enhanced by the push rods coinciding with the center of the bearings 74 which insures that the total reaction of the push rods is in the form of direct load being transmitted to the bearings 74. Furthermore, since the longitudinal axis of the torsion shaft passes through the center of rotation of the cam plate and the longitudinal axis of the pump shaft at the point in which the plane through the center of the spherical ends of the pistons coincides with the longitudinal axis of this shaft, the tilting movement induced on the cam plate by this pistons may be accurately counterbalanced by the biasing force provided for the push rod 94. This also provides for the accurate control of the angular displacement of the cam plate in response to the pump output pressure.

Although the invention has been described with reference to particular applications, the principles involved are susceptible to numerous other applications that will be readily apparent to persons skilled in the art; therefore, the invention is to be limited only by the scope and spirit of the appended claims.

What is claimed is:

1. A displacement changing mechanism for use with a fluid pressure energy translating device having a housing and a tiltable cam plate for changing the length of piston stroke, a pivot pin journalling said tiltable cam plate in respect to said housing, said mechanism comprising, control means responsive to the output pressure of said device and arranged to produce a pressure control signal, an actuating member operable by said control signal, a rotatable member operable by said actuating member, and a torsion shaft operatively interconnecting said rotatable member and said tiltable cam plate, said torsion shaft extending axially through the center of the pivot pin to transmit rotational motion of said rotatable member to said cam plate.

2. The combination of claim 1 wherein said rotatable member is journalled on the pivot pin.

3. A displacement changing mechanism for use with a fluid pressure energy translating device having a housing and a tiltable cam plate for changing the length of piston stroke, a pivot pin journalling said tiltable cam plate in respect to said housing, said mechanism comprising, control means responsive to the output pressure of said device and arranged to produce a pressure control signal, an actuating member operable by said control signal, a rotatable member journalled on said pivot pin operable by said actuating member, a torsion shaft operatively interconnecting said rotatable member and said tiltable cam plate, a central axial bore extending through said pivot pin, said torsion shaft extending through said axial bore to transmit rotational motion of said rotatable member to said cam plate, and means interposed between said torsion shaft and the wall of said bore to maintain said torsion shaft out of contact with the wall of said axial bore.

4. A displacement changing mechanism for use with a fluid pressure energy translating device having a housing and a tiltable cam plate for changing the length of piston stroke, a pivot pin journalling said tiltable cam plate in respect to said housing, said mechanism comprising, control means responsive to the output pressure of said device and arranged to produce a pressure control signal, an actuating member operable by said control signal, said actuating member including a reciprocal member actuatable by said pressure control signal, a rotatable member operable by said actuating member, and a torsion shaft operatively interconnecting said rotatable member and said tiltable cam plate, said torsion shaft extending axially through the center of the pivot pin to transmit rotational motion of said rotatable member to said cam plate.

5. The combination of claim 4 wherein said reciprocal member includes a push rod operable against said rotatable member.

6. A displacement changing mechanism for use with a fluid pressure energy translating device having a housing and a tiltable cam plate for changing the length of piston stroke, a pivot pin journalling said tiltable cam plate in respect to said housing, said mechanism comprising, control means responsive to the output pressure of said device and arranged to produce a pressure control signal, an actuating member operable by said control signal, said actuating member including a push rod, a rotatable member operable by said push rod, a torsion shaft operatively interconnecting said rotatable member and said tiltable cam plate, said torsion shaft extending axially through the center of the pivot pin to transmit rotational motion of said rotatable member to said cam plate, and biasing means operable against the rotatable member in opposition to the push rod, said biasing means normally urging the cam plate through said torsion shaft it its maximum piston displacement position.

7. A displacement changing mechanism for use with a fluid pressure energy translating device having a housing and a tiltable cam plate for changing the length of piston stroke, a pivot pin journalling said tiltable cam plate in respect to said housing, said mechanism comprising, control means responsive to the output pressure of said device and arranged to produce a pressure control signal, an actuating member operable by said pressure control signal, said actuating member including a push rod, a rotatable member operable by said push rod, a bearing journally said rotatable member on said pivot pin, a torsion shaft operatively interconnecting said rotatable member and said tiltable cam plate, said torsion shaft extending axially through the center of the pivot pin to transmit rotational motion of said rotatable member to said cam plate, and a biasing spring operable against the rotatable member in opposition to the push rod, said biasing spring normally urging the cam plate through the torsion shaft to its maximum piston displacement position.

8. The combination of claim 7 wherein a plane passing through the axis of the push rod and the axis of the bearing spring passes through the longitudinal center of the bearing journalling the rotatable member, whereby the torsion bar is maintained substantially free of bending moments.

9. In the combination of claim 8 the provision of piston return springs operable against said pistons, the force of said piston return springs being transmitted to said cam plate in opposition to said biasing spring.

10. A displacement changing mechanism for use with a fluid pressure energy translating device having a housing and a tiltable cam plate therein for changing the length of the piston stroke and receiving the reaction forces from the pistons, said mechanism comprising control means responsive to the output pressure of said device and arranged to produce a control signal, an actuating member operable by said control signal, a rotatable member operable by said actuating member, torsion means interposed between said rotatable member and said cam plate for transmitting the angular displacement of the rotatable member to the cam plate, and reaction means for isolating said reaction forces from said torsion means.

11. The mechanism of claim 10 further characterized by said reaction means being carried by said housing.

12. The mechanism of claim 11 further characterized by said cam plate and said rotatable member being independently mounted on said reaction means.

13. The mechanism of claim 10 wherein said torsion means includes a torsion shaft.

References Cited by the Examiner

UNITED STATES PATENTS

| | | | |
|---|---|---|---|
| 2,718,758 | 9/55 | Minshall et al. | 103—162 |
| 2,735,374 | 2/56 | Shaw et al. | 103—162 |
| 2,910,008 | 10/59 | Weinsenbach | 103—162 |

FOREIGN PATENTS

| | | |
|---|---|---|
| 974,089 | 5/60 | Germany. |
| 169,880 | 10/21 | Great Britain. |
| 754,836 | 2/54 | Great Britain. |

LAURENCE V. EFNER, *Primary Examiner.*

ROBERT M. WALKER, *Examiner.*